United States Patent [19]

Loiselle

[11] Patent Number: 5,758,596
[45] Date of Patent: Jun. 2, 1998

[54] SELF CLEANING BIRD FEEDER AND METHOD

[76] Inventor: Guy J. Loiselle, 1471 Greenville, Bellingham, Wash. 98226

[21] Appl. No.: 500,225

[22] Filed: Jun. 30, 1995

[51] Int. Cl.⁶ ........................................ A01K 39/00
[52] U.S. Cl. ............................................. 119/52.2
[58] Field of Search ........................ 119/52.1, 52.2, 119/52.3, 54, 57.8, 57.9

[56] References Cited

U.S. PATENT DOCUMENTS

| | | |
|---|---|---|
| 1,123,501 | 1/1915 | Dreibelbis . |
| 3,301,217 | 1/1967 | Prowinsky . |
| 3,399,650 | 9/1968 | Goodman ............... 119/57.9 |
| 3,948,220 | 4/1976 | Fiedler . |
| 4,414,922 | 11/1983 | Hyde Jr. . |
| 4,434,745 | 3/1984 | Perkins et al. . |
| 5,195,459 | 3/1993 | Ancketill . |
| 5,203,281 | 4/1993 | Harwich . |
| 5,377,617 | 1/1995 | Harwich . |

OTHER PUBLICATIONS

Reg No. 1,765,500 Magnum Feeders Indiana Corp. Apr. 1993.

*Primary Examiner*—Thomas Price
*Attorney, Agent, or Firm*—Robert B. Hughes; Hughes, Multer & Schacht

[57] ABSTRACT

A bird feeder having a containing section for sunflower seeds, such seeds having a meat portion and a surrounding husk.

A lower platform with through openings surrounds the containing section, with the openings being sufficiently small to retain full seeds thereon, but large enough to permit husk fragments to drop through the openings. The bird feeder is thus self cleaning, with rain, wind and the movement of the birds causing husks to drop through the platform, while whole seeds can be retained thereon for feeding.

17 Claims, 3 Drawing Sheets

2

SELF CLEANING BIRD FEEDER AND METHOD

BACKGROUND OF THE INVENTION a) Field of the Invention

The present invention relates to a bird feeder and a method of feeding birds, and more particularly to such a bird feeder and method where the feed is in the form of seeds, such as sunflower seeds, millets, thistle seeds, and similar bird feed.

b) Background Art

One common type of bird feed is seeds where the meat of the seed is still within the husk. One common way of providing such bird seed is to place the bird seed in a bird feeder where there is a perforate sidewall that forms the seed containing chamber. There is commonly an imperforate base member which encloses the bottom of the containing area and also extends outwardly therefrom to form a perimeter platform on which the birds can perch.

The birds perch themselves on the platform and use their beaks to withdraw the seeds from the containing area. The bird will commonly chew the seed to separate the meat of the seed from the husk and let the husk drop onto the platform. As the husks collect on the platform, it is generally necessary to clean the husks off the platform. Another problem is that if moisture collects in the bottom part of the container or possibly in the platform, and some of the seeds remain on the platform, these will sometimes sprout. This also require periodic cleaning.

A search of the patent literature has disclosed a number of bird feeders, and these are the following:

U.S. Pat. No. 5,377,617 (Harwich) shows a feeder specifically designed to feed butterflies and moths. There is an inside solid core on which food may be placed, and there is a protective screen spaced outwardly from the feeder. A butterfly or a moth, having a longer proboscis through which the insect feeds, is able to extend the proboscis through the protective screen to have access to the feed.

U.S. Pat. No. 5,203,281 (Harwich) discloses a collapsible feeder for butterflies.

U.S. Pat. No. 5,195,459 (Ancketill) shows a bird feeder where there is a spring loaded cover which is able to move downwardly to enclose the feeding area. When an animal such as a squirrel places its weight on the cover, then the cover (by reason of the weight of the squirrel) moves downwardly to close off the feeder.

U.S. Pat. No. 4,434,745 (Perkins) shows a bird feeder where there is an inside perforate container holding the bird feed, and an open structure enclosing the container for limiting access to squirrels and the like.

U.S. Pat. No. 4,414,922 (Hyde Jr.) discloses a bird feeder where there are resilient fingers that cover the access ports to the food in the bird feeder. The bird can thus reach in with its beak to feed, while the food is prevented from falling out.

U.S. Pat. No. 3,948,920 (Fiedler) shows a bird feed holder in the form of two hemispheres. The bottom one is perforated so that the birds can reach their food through the openings. The two hemispherical section are arranged to rotated freely about a rod in response to movement of the birds during their arrival at and use of the feeding station, so that this encourages bird acrobatics that is entertaining to bird watchers.

U.S. Pat. No. 3,399,650 (Goodman) shows a bird feeder which is arranged to discourage the feeding of the larger less desirable birds. In column 2, beginning at line 30, it is stated that:

"... It is to be understood that the feeder of this invention is not a loose bird feeder, rather it is a container for material of larger mass, such as pieces of suet, globs of peanut butter, cakes made from seed and binder and like bird food."

There is a closed sidewall of a fine mesh screen (e.g. ⅛th inch mesh) so that the larger birds have difficulty getting their beaks through the wire. There is a base which extends beneath the bottom of the containing area and also forms a perimeter flange. The mesh of the base is larger (three eighths of an inch to one half an inch) so that the smaller birds can feed through the bottom mesh layer by perching below the bottom layer at the containing area in an upside down position.

As for the larger birds, the width dimension of the flange is made sufficiently large (e.g. two and one half inches) so that the larger birds are not able to perch at the perimeter of the flange and reach their beaks beneath the bird feeder to feed from the bottom of the feeder.

U.S. Pat. No. 3,301,217 (Prowinaky) shows a bird feeder having a sidewall formed with a mesh like material. The feeder can be moved vertically from an upper position on a post to a lower position.

U.S. Pat. No. 1,123,501 (Drebelbis) shows a mesh fronted holder for table scraps. Chickens feed through the mesh. Thus the food is kept off the ground and thus away from other animals.

SUMMARY OF THE INVENTION

The bird feeder of the present invention is substantially self cleaning, and is particularly adapted to provide for birds whole seeds, having meat of the seeds surrounded by a husk.

The feeder comprises a seed containing section comprising an enclosed sidewall defining a seed containing chamber. The sidewall has openings which are sufficiently small to contain seeds in the chamber and are sufficiently large to enable a bird to move the bird's beak through the openings to extract seeds from the chamber.

There is a base structure which extends across and encloses a bottom part of the chamber. There is also a perimeter platform extending around a lower part of the seed containing structure. This platform has openings over its surface. These openings are sufficiently small so that whole seeds extracted from the chamber generally remain supported on the platform, and sufficiently large to permit husk fragments removed from the meat of the seeds to fall through the openings.

Thus, birds are able to perch on the platform, extract seeds from the containing section, chew the seeds and deposit husk fragments onto the platform, and natural elements, such as wind, rain and birds moving to and from the platform, as well about the platform, cause removal of the husk fragments on the platform. Also, water does not accumulate on the platform.

Desirably, the openings of the platform have a maximum dimension less than an average maximum dimension of the whole seeds. With the bird feeder being adapted to contain sunflower seeds and/or having seeds having maximum dimensions substantially similar to sunflower seeds, the maximum dimension across the openings in the platform are less than three eighths of an inch. More desirably, such openings are no greater than about one quarter to five sixteenths of an inch. Further, the openings in the platform have a secondary dimension less than the maximum dimension.

Also, in the preferred form, the holes in the platform are made of a wire mesh, which cross each other to form the openings in the platform as diamond shape, having a length dimension greater than the width dimension.

Further, in the preferred form, the base structure and the perimeter platform are made of a single wire mesh material extending across the lower end of the containing section and forming the perimeter platform.

Desirably, the base section is made of a perforate material to let water flow therethrough.

Also, the present invention comprises the combination of a bird feeder, with the seeds contained therein. The feeder itself and also the seeds are as described as above.

In the method of the present invention, both the feeder and the seeds are provided as described above. The seeds are placed in the containing chamber, and the feeder is placed at a position where birds are permitted to feed from the container, and also where the natural elements, namely the wind, rain and action of the birds, is such as to cause a self-cleaning action of the feeder.

Other features will become apparent from the following detailed description.

DESCRIPTION OF THE PREFERRED EMBODIMENT

Figure 1:
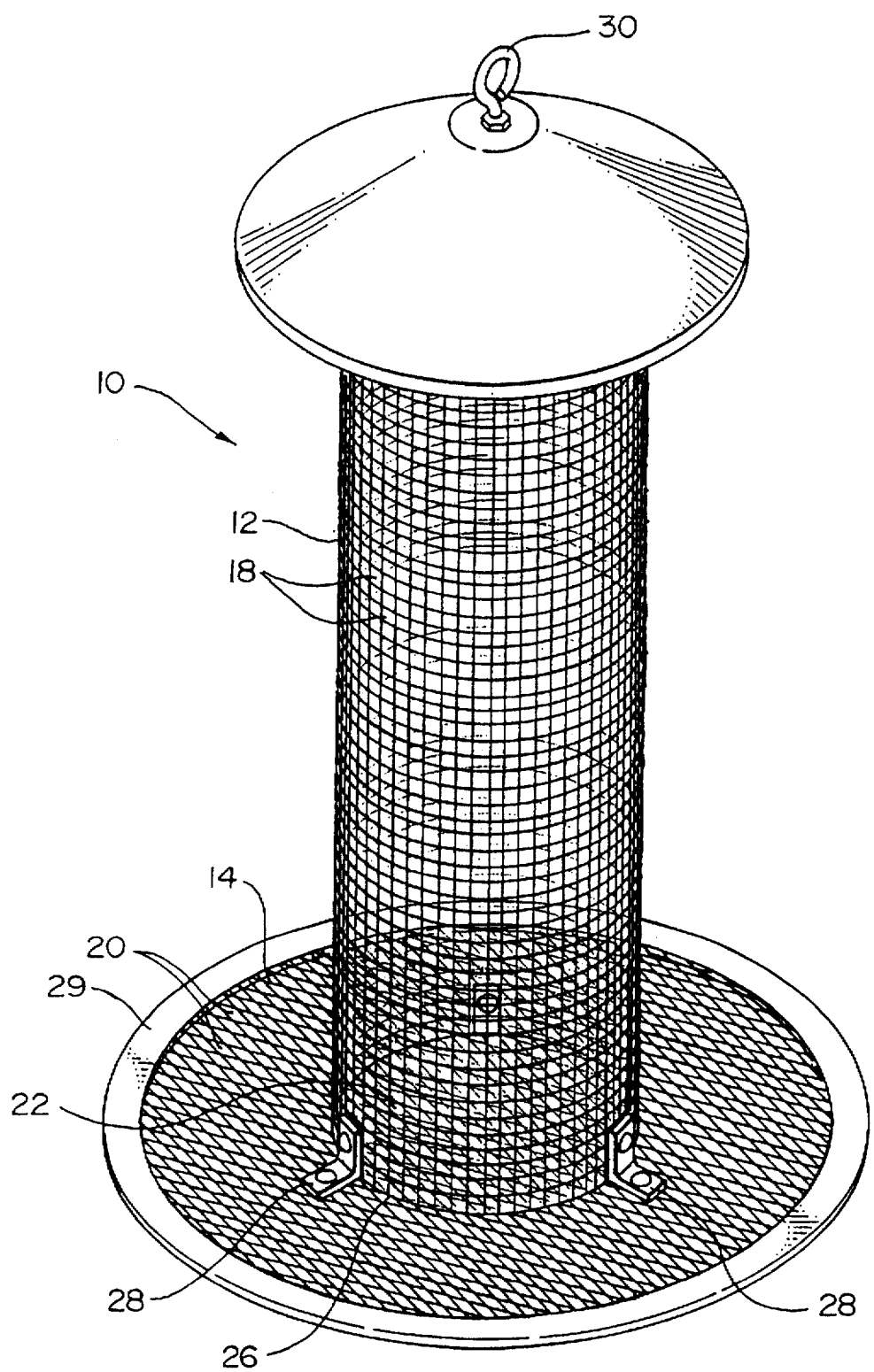
FIG. 1 is an isometric view showing the bird feeder of the present invention.

The bird feeder 10 of the present invention comprises a cylindrical containing portion 12, a base 14 connected to the bottom end of the containing section 12, and a top cover 16 removably mounted to the top end of the containing section 12.

The cylindrical containing section 12 is made of a relatively rigid screen material formed in a crossing configuration to form plurality of square openings 18 over its entire surface. The height and width dimension of these openings 18 is, in the preferred embodiment of this present invention which is designed to contain sunflower seeds as the bird feed, approximately one quarter of an inch.

The base 14 is also made of a relative rigid screen-like material, but the wires of the screen are arranged in a "flattened" diamond shaped pattern. This pattern is shown in an enlarged scale in FIG. 2. In this preferred embodiment of the present invention, the lengthwise dimension of the diamond shaped opening 20 is one quarter of a inch, while the crosswise dimension is approximately three sixteenth of an inch.

The base 14 can be considered as having two sections. First, there is the central section 22 which covers the lower cylindrical area defined by the bottom of the cylindrical containing member 12. Second, there is a perimeter section 24 which defines a surrounding flange or platform that surrounds the lower end edge 26 of the containing section 12. The base 14 is fixedly attached to the containing section 12 by means of right angle fasteners 28. The perimeter of the flange portion 24 is connected to a more rigid metal ring 29.

The top cover 16 is imperforate, and it has a disc-like configuration with a diameter moderately larger than the diameter of the containing section 12 and with its top surface. This cover 16 is removably attached to the top of the containing section by conventional means, which could be a resilient snap attachment, such as a plurality of resilient fingers having curved attaching edge portions that are able to grasp adjacent wires in the upper part of section 12. Connected to the top middle portion of the cover is a connecting loop 30 by which the feeder can be suspended from some higher member.

Figure 3:
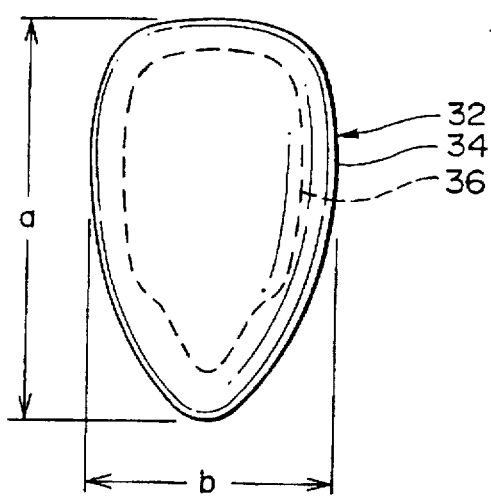
FIG. 3 is a plan view showing a typical sunflower seed used as bird feed in the present invention.

As indicated earlier in this text, the feeder 10 of the present invention is particularly adapted to contain and dispense seeds where the husks still retain the meat of the seed. Such a sunflower seed is illustrated at 32 in FIG. 3. The husks is designated 34, and the meat of the scene is shown in broken lines at 36.

A bird generally eats the seed 32 by reaching its beak through an opening 18 in the feeding section to grasp the seed 32 and then pull it out of the containing section 12. The bird will then chew on the seed with its beak to separate the meat 36 from the husk 34 and drop or spit the husk onto the platform or flange 24. In some instances, the bird may drop the seed 32 onto the platform 24 temporarily to again grasp it with the beak to engage the seed 32 in its beak for additional chewing.

As the feeding of the birds continues, some of the husk fragments fall through the platform 24 and some begin to accumulate on the platform 24. As the birds land and take-off from the feeder 10 or move to different parts of the feeder. The movement of the birds will cause more of the husk fragments to be moved so that these fall through the openings 20 in the platform 24. Also, the wind will sometimes blow against the feeder 10, either blowing the husks off or causing some swaying of the feeder 10, which, in combination with the blowing causes the husks to drop off the platform 24 or through the platform openings 20.

Also, since the platform 24 is perforate, water does not collect on the platform 24. This alleviates any tendency for the husks to adhere to the platform 24. In prior art devices, where the platform is made solid, even a very small accumulation of moisture will create as tendency for the husk fragments to adhere to the surfaces. Also, if there are seeds which remain on the platform, these can sprout on the platform. Another problem is that fecal matter from the birds can collect on the impervious prior art platforms.

The overall result is, with prior art bird feeders, that the platform must be periodically cleaned to remove the husks and any accumulation of related matter resulting from the presence of the husks on the platform.

One of the important relationships of the present invention is the relative sizing of the openings 18 (in the containing section 12) and the openings 20 (in the base member 14, and particularly in the platform section 24 of the base 14. To explain this further, reference is again made to FIG. 3. In a typical sunflower seed of larger size, the length dimension (indicated at "a") is about three eighths of an inch. The width dimension (shown at "b" in FIG. 3) is about three sixteenth of an inch. The thickness dimension is about one eighth of an inch. These dimensions can vary, and the width dimension, for example, could possibly vary from as much of one eighth of an inch to a quarter of an inch. Also, the length of the sunflower seed will vary to some extent. It has been found that if the square openings in the containing section 12 are made approximately one quarter of an inch in the height and width dimension, when the sunflower seeds are loaded through the top end of the containing section 12 (the lid 16 being removed for this purpose), the sunflower seeds 32 are retained in the containing section 12. However, the openings 18 are sufficiently large so that the bird is able to move its beak through the openings 18, and grasp the individual seeds 32 and maneuver these through the openings 18.

Figure 2:
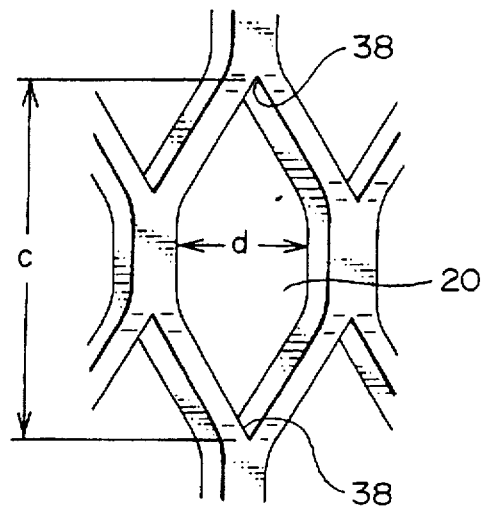
FIG. 2 is an enlarged view of part of the platform.
Figure 4:
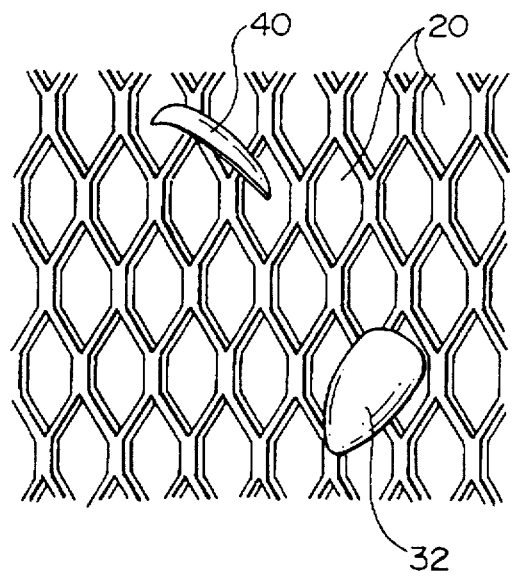
FIG. 4 is a plan view of the platform of the bird feeder, showing a whole seed resting on the platform and a piece of a husk.

To turn our attention to the openings 20 in the platform section 24, with reference to FIG. 2, these are somewhat smaller than the openings 18 in that the longer diagonal dimension from one corner 38 to the diagonally opposite corner 38 (indicated at "c") is about one fourth to five sixteenth of an inch. The sides of each opening 24 are made flat so that the overall shape of the opening 24 is hexagonal with the hexagon being extended in one dimension between opposite points. The side to side dimension (indicated at "d" in FIG. 2 is about one eighth to three sixteenths of an inch (slightly less then the lengthwise dimension). Thus, if whole seeds 32 fall onto the platform 24, these are less likely to slip through the openings 20. However, as the birds chew on the seeds 32 and to break the husks 34 up into smaller pieces, many of the husk pieces (one being shown at 40 in FIG. 4) readily fall through the openings 20. Further, those larger pieces of husks that tend to accumulate may, after a certain amount of jostling or movement, become positioned to drop through one of the openings 20. Also, these larger husk portions are more readily blown off the platform by the wind moved off by the movement of the birds. FIG. 4 shows a seed 32 and the husk portion 40 resting on the platform 24.

With regard to the central section 22 of the base 14, for convenience of manufacture, the entire base 14 is simply made from one piece of screen material. Thus, the configuration and size of the openings in the central section 22 are the same as with the perimeter platform 24. The size of the openings in the central base section 22 should be such that these will properly retain the seeds 32, but permit the water to flow therethrough so that there is no accumulation of water in the bottom of the containing section 12.

The dimensions presented above are what are believed to be the optimized dimensions for sunflower seeds. Within these optimized dimensions, the crosswise dimensions of the square openings 18 should be less than three eighths of an inch, and at least 3/16th of an inch. With regard to the openings 20, while these are desirably made in a "flattened" diamond shaped pattern (or more broadly in moderately elongate pattern where the length is moderately greater than the width), these also could be made in a square configuration. In this case, normally the openings 20 would be made to have a smaller dimension than those of the openings 18, possibly ten to thirty percent smaller.

In the event that the feeder 10 is designed to contain other seeds, such as millet seeds or thistle seeds, the dimensions as given above should be scaled down to match the size of such seeds. For example, the millet seed may be only one sixteenth of an inch long, in that instance, the overall dimensions of the openings 20 in the platform section 24 should be moderately less one sixteenths of an inch in the length and width dimensions.

With regard to the overall dimension of the feeder 12, these have been made with the base 14 having a diameter between eight inches to twenty four inches. The width diameter of the containing section 12 has been made in models ranging from four inches to sixteen inches. The height of the bird feeder is determined mainly as a matter of convenience. The height or the containing section 12 will normally be about two to four times the diameter of the containing section 12.

Figure 5:
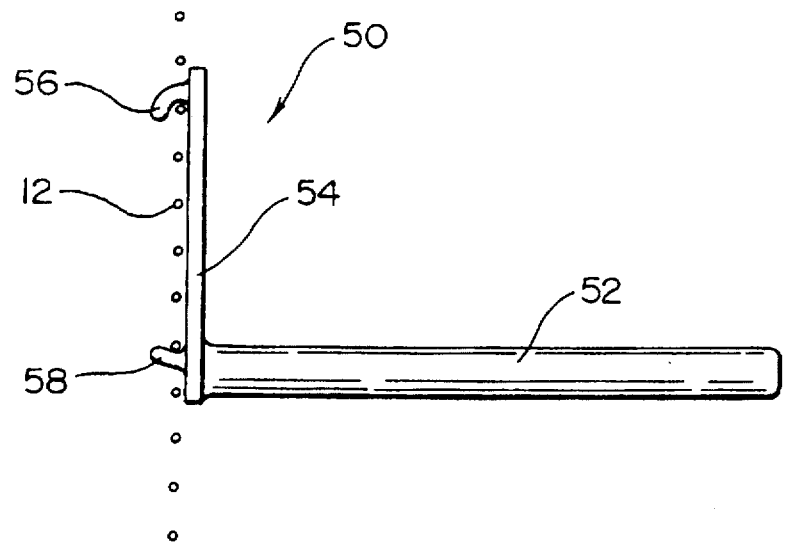
FIGS. 5 and 6 are side elevational views of two types of perches that could be mounted to the bird feeder.

It may be desired to place a perch above the platform 24. This can be accomplished as shown in FIG. 5, where there is a perch attachment 50 having a horizontal perching arm 52 connected to a mounting arm 54. The mounting arm 54 in turn has an upper hook member 56 to engage one of the wires of the containing section 12, and also a locating finger 58 extending through one of the openings 18 of the containing section 12. In the configuration of FIG. 5, the perch arm 52 is located at the lower end of the mounting arm 54.

Figure 6:
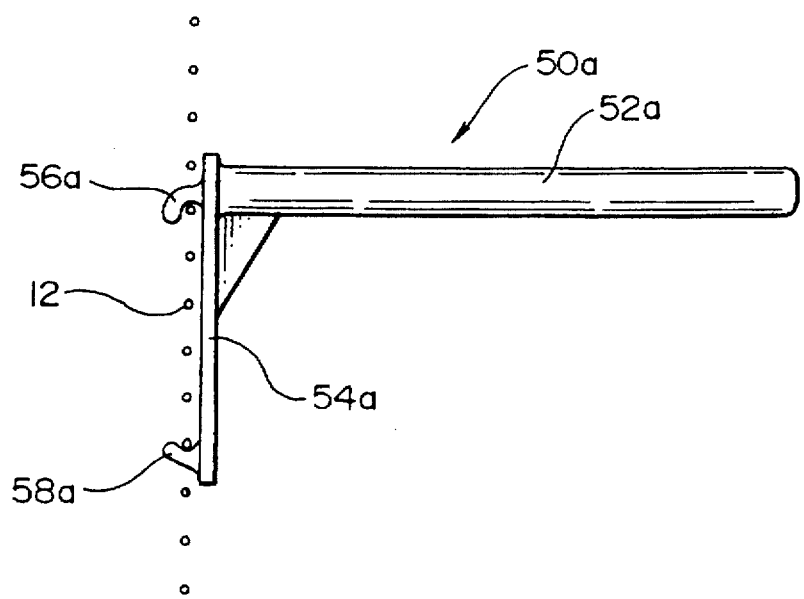

FIG. 6 shows a perch attachment 50a similar to that shown in FIG. 5. The same numerical designations are given to corresponding parts. The main difference is that the perch arm 52a is mounted to the top part of the mounting arm 54a. In other respects, the perch attachment 50a is similar to the one shown in FIG. 5 at 50.

It is believed that the operation of the present invention is readily apparent from the foregoing description. However, to review this briefly, first, as with usual bird feeders, the feeder is placed at a location where it is largely inaccessible to other animals (e.g. squirrels) or at least where accessibility to such animals is difficult. In the present configuration, there is provided the end loop 30 by which the feeder 12 could be suspended from a rope or cable or some other structure. The feeder is filled with bird seed by removing the containing section 12 from the cover 16 and pouring the sunflower seed (or other such feed for which the present invention is adapted) into the containing section 12. Then the containing section 12 is reattached to the cover 16 of the feeder 10, and placed back in its feeding location.

From this point on, the operations of the feeder 10 is largely accomplished by the action of the birds, and the forces of nature (e.g. wind and rain). In fact, a significant aspect of the present invention is that the feeder 12 is substantially self-cleaning, and human intervention is not necessary until the bird seed supply in the feeder 10 is sufficiently diminished so that the feeder 10 needs to be filled again.

After the feeder 10 is filled and put back in position, substantially all of the seeds in the containing section 12 are retained within that section 12. As birds land on the platform 24 and begin withdrawing bird seeds (in this instance the sunflower seeds 32) from the containing section 12, the birds (as described previously) chew the seeds to separate the meat 34 from the husk 36, with the husks 36 being broken into fragments and dropped upon the platform 24. In some instances, as the bird removes one of the seeds, one or more seeds may fall on the platform 24. Since the openings 20 in the platform 24 are sized and configured to tend to retain the seeds 32 when in their original form (where the meat 34 and the husk 36 remain together as a unitary seed), these seeds 32 will normally be retained on the platform 24.

If there is rain, any of the rain falling on the platform will obviously flow through the openings 20. In some instances, the rain will tend to wash the husk fragments through the openings 20. Also the rain will tend to wash the fecal matter from the birds through the openings 20. If some of the rain is blown into the seeds within the containing section 12, it will simply flow through the middle base section 22. Thus, there is no accumulation of moisture to cause the seeds 32 to sprout.

The natural action of the wind and the rain will cause most (or substantially all) of the husk fragments to either be blown off or washed off of the platform 24. Also, the action of the wind will tend to clear off the husk fragments. Further, the movement of the birds over the surface of the platform 24 will shuffle the husk fragments so as to position many of these to drop through the openings 20.

It is obvious that various modifications could be made in the present invention without department from the basic teachings thereof.

Now therefore, I claim:

1. A self-cleaning bird feeder particularly adapted to provide for birds whole seed, having meat of the seeds surrounded by a husk, said feeder comprising:
   a. a seed containing section comprising an enclosed sidewall defining a seed-containing chamber, said sidewall having relatively larger openings which are within a range to be sufficiently small to contain seeds in the chamber and are sufficiently large to enable a bird to move the bird's beak through the openings to extract seeds from the chamber;
   b. a base structure which extends across and encloses a bottom part of said chamber, said base structure having opening means which permit water to pass therethrough and are sufficiently small to retain the seeds within the chamber;
   c. a perimeter platform extending around a lower part of said seed containing structure, said platform having relatively smaller openings over its surface which openings are within a range to be sufficiently small so that whole seed extracted from the chamber generally remain supported on the platform, and sufficiently large to permit husk fragments removed from the seeds to fall through the openings.

2. The bird feeder as recited in claim 1, wherein the maximum dimension across the openings in the platform are no greater than about one fourth of an inch.

3. The bird feeder as recited in claim 1, wherein the maximum dimension across the openings in the platform are no greater than about one quarter of an inch, and the secondary lesser dimension across the openings in the platform have a width dimension less than the maximum dimension.

4. The bird feeder as recited in claim 1, wherein the holes in the platform are made of a wire mesh, which cross each other to form the openings in the platform as an oblong shape, having a length dimension greater than the width dimension.

5. The bird feeder as recited in claim 1, wherein said base structure and the perimeter platform are made of a single wire mesh material section extending across the lower end of the containing section and forming the perimeter platform.

6. A self-cleaning bird feeder particularly adapted to provide for birds whole seed, having meat of the seeds surrounded by a husk, said feeder comprising:
   a. a seed containing section comprising an enclosed sidewall defining a seed-containing chamber, said sidewall having relatively larger openings which are within a range to be sufficiently small to contain seeds in the chamber and are sufficiently large to enable a bird to move the bird's beak through the openings to extract seeds from the chamber;
   b. a base structure which extends across and encloses a bottom part of said chamber, said base structure having opening means which permit water to pass there through and are sufficiently small to retain the seeds within the chamber;
   c. a perimeter platform extending around a lower part of said seed containing structure, said platform having relatively smaller openings over its surface which openings are within a range to be sufficiently small so that whole seeds extracted from the chamber generally remain supported on the platform, and sufficiently large to permit husk fragments removed from the seeds to fall through the openings;
   d. said bird feeder being adapted to contain sunflower seeds and/or seeds having maximum dimensions substantially similar to sunflower seeds, and the maximum dimension across the openings the platform is less than three eighths of an inch.

7. The bird feeder as recited in claim 6, wherein the openings of said platform have a maximum dimension less than an average maximum dimension of the whole seeds.

8. The bird feeder as recited in claim 6, wherein the bird feeder is adapted to contain sunflower seeds and/or seeds having maximum dimensions substantially similar to sunflower seeds.

9. The bird feeder as recited in claim 6, wherein the maximum dimension across the openings in the platform is no greater than about one fourth of an inch.

10. The bird feeder as recited in claim 6, wherein the maximum dimension across the openings in the platform are no greater than about one quarter of an inch, and the secondary lesser dimension across the openings in the platform have a width dimension less than the maximum dimension.

11. The bird feeder as recited in claim 6, wherein the holes in the platform are made of a wire mesh, which cross each other to form the openings in the platform as an oblong shape, having a length dimension greater than the width dimension.

12. The bird feeder as recited in claim 6, wherein said base structure and the perimeter platform are made of a single wire mesh material section extending across the lower end of the containing section and forming the perimeter platform.

13. A method of feeding birds whole seeds, having meat of the seeds surrounded by a husk, said method comprising:
   a) providing a feeder comprising:
      i) a seed containing section comprising an enclosed sidewall defining a seed containing chamber;
      ii) a base structure which extends across and encloses a bottom part of said chamber;
      iii) a perimeter platform extending around a lower part of said seed containing structure;
   b) placing a quantity of whole seeds for birds in said containing chamber, said seeds having meat of the seeds within husks of the seeds;
   c) providing said sidewall with relatively larger openings which are within a range to be sufficiently small to contain seeds in the chamber and are sufficiently large to enable a bird to move the bird's beak through the openings to extract seeds from the chamber;
   d) providing said platform with relatively smaller openings over its surface, which openings are within a range to be sufficiently small so that whole seeds extracted from the chamber generally remain supported on the platform, and sufficiently large to permit husk fragments removed from the seeds to fall through the openings;
   e) placing said feeder where birds are able to perch on the platform, and extract seeds from the containing section, chew the seeds and deposit husk fragments onto the platform;
   f) also placing said feeder where natural elements, such as wind, rain and birds moving to and from the platform, as well as about the platform, cause removal of the husk fragments from the platform, and also, water does not accumulate on the platform.

14. The method as recited in claim 13, wherein the openings of said platform have a maximum dimension less than an average maximum dimension of the whole seeds.

15. The method as recited in claim 13, wherein the bird feeder is adapted to contain sunflower seeds and/or seeds having maximum dimensions substantially similar to sunflower seeds, and the maximum dimension across the openings in the platform is less than three eighth of an inch.

16. The method as recited in claim 13, wherein the maximum dimension across the openings in the platform are no greater than about one fourth of an inch.

17. The method as recited in claim 13, wherein said base structure and the perimeter platform are made of a single wire mesh material section extending across the lower end of the containing section and forming the perimeter platform.

* * * * *